United States Patent
Takeda

[19]

[11] Patent Number: 6,094,519
[45] Date of Patent: Jul. 25, 2000

[54] GAIN EQUALIZING DEVICE

[75] Inventor: Taiichi Takeda, Kawasaki, Japan

[73] Assignee: Fujitsu Limited, Kawasaki, Japan

[21] Appl. No.: 09/189,982

[22] Filed: Nov. 12, 1998

[30] Foreign Application Priority Data

Mar. 13, 1998 [JP] Japan ................................. 10-062584

[51] Int. Cl.$^7$ .................................................. G02B 6/00
[52] U.S. Cl. .......................................................... 385/138
[58] Field of Search .................................. 385/135–138, 385/147, 37, 13, 123; 65/385; 427/163.2, 487, 501, 508, 516; 359/341, 132, 589; 250/227.23, 227.24, 574; 522/33, 14, 28, 68

[56] References Cited

U.S. PATENT DOCUMENTS

| | | | |
|---|---|---|---|
| 4,839,527 | 6/1989 | Leitch | 250/573 |
| 5,436,760 | 7/1995 | Nakabayashi | 359/341 |
| 5,510,745 | 4/1996 | Hamano et al. | 327/333 |
| 5,773,486 | 6/1998 | Chandross et al. | 522/33 |
| 5,822,113 | 10/1998 | Delavaux et al. | 359/341 |
| 5,920,424 | 7/1999 | Espindola et al. | 359/341 |
| 5,937,126 | 8/1999 | Yamamoto et al. | 385/123 |
| 5,963,110 | 10/1999 | Ihara et al. | 333/28 R |
| 5,989,627 | 11/1999 | Blyler et al. | 427/163.2 |
| 5,999,671 | 12/1999 | Jin et al. | 385/37 |

Primary Examiner—Akm E. Ullah
Attorney, Agent, or Firm—Staas & Halsey

[57] ABSTRACT

A gain equalizing device capable of realizing optimum gain equalization according to the amplification characteristic of a repeater and the transmission characteristic of a cable. The gain equalizing device includes a pressure-resistant housing consisting of a cylinder and first and second covers welded to the opposite ends of the cylinder. A plurality of optical fibers of a first tail cable are introduced into the pressure-resistant housing through a first feed through mounted to the first cover, and a plurality of optical fibers of a second tail cable are introduced into the pressure-resistant housing through a second feed through mounted to the second cover. A mounting plate is mounted on the first cover, and a plurality of optical equalizing modules are mounted on the mounting plate. A fiber accommodating structure accommodating a plurality of splice portions for respectively splicing the optical fibers of the first tail cable to the optical fibers of the second tail cable is mounted on the second cover.

14 Claims, 15 Drawing Sheets

GAIN EQUALIZING DEVICE

BACKGROUND OF THE INVENTION

1. Field of the Invention

The present invention relates to a gain equalizing device suitable for use in an optical transmission system for transmitting wavelength division multiplexed (WDM) signal light including a plurality of channels of optical carriers having different wavelengths.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, an optical amplifier for directly amplifying signal light has been put to practical use. An optical amplifier known in the art includes an optical amplifying medium to which signal light to be amplified is supplied and means for pumping (exciting) the optical amplifying medium so that the optical amplifying medium provides a gain band including the wavelength of the signal light.

For example, an erbium doped fiber amplifier (EDFA) includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength band of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In an optical transmission system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. At the receiving end, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by a gain characteristic (wavelength dependence of gain) which is represented by a gain deviation or gain tilt. For example, in an EDFA, a gain deviation is produced at wavelengths in the vicinity of 1.55 $\mu$m. When a plurality of EDFAs are cascaded to cause accumulation of gain deviations, an optical SNR (signal-to-noise ratio) in a channel included in a band giving a small gain is degraded.

To cope with the gain deviation of an optical amplifier, an optical equalizing module incorporating an optical equalizing filter is used. Before a degradation in optical SNR in a certain channel becomes excessive due to accumulation of gain deviations, gain equalization is performed by the optical equalizing module provided at a suitable position. In a WDM long-haul optical transmission system, a gain equalizing device incorporating a plurality of such optical equalizing modules is used. A conventional gain equalizing device is configured so that a pressure-resistant housing unit for an optical submarine repeater is utilized because emphasis is placed on general versatility of a housing, and a plurality of optical equalizing modules are mounted in the pressure-resistant housing unit.

Such a pressure-resistant housing unit for an optical submarine repeater is complex in structure because it has a buffer, insulator, etc. for protecting a repeater circuit unit. Further, a gain equalizing device used in a WDM long-haul optical transmission system to be developed in the future must be adjusted so as to match the amplification characteristic of a repeater and the transmission characteristic of an optical cable.

It is accordingly necessary to first connect a plurality of optical submarine repeaters through optical cables in the field, next select an optical equalizing module having an optimum characteristic, and then connect the selected optical equalizing module to an optical fiber constituting a transmission line. In other words, it is required to develop a gain equalizing device including a plurality of optical equalizing modules having different characteristics which can be connected to one optical fiber transmission line.

In the case of an optical cable accommodating two systems, each system is required to have two optical fibers for up and down channels, so that totally four optical fibers are included in the optical cable. In the conventional gain equalizing device applied to two systems, four optical equalizing modules respectively connected to four optical fibers are mounted in the pressure-resistant housing unit. However, to provide a gain equalizing device precisely matching the amplification characteristic of an optical submarine repeater and the transmission characteristic of a cable, it is desirable to provide a plurality of optical equalizing modules having different characteristics for one optical fiber and select one optical equalizing module having an optimum characteristic from these optical equalizing modules.

SUMMARY OF THE INVENTION

It is therefore an object of the present invention to provide a gain equalizing device having a plurality of optical equalizing modules selectively connectable to one optical fiber.

It is another object of the present invention to provide a compact gain equalizing device having a mounting structure which can mount a plurality of optical equalizing modules in a housing.

In accordance with an aspect of the present invention, there is provided a gain equalizing device comprising a pressure-resistant housing comprising a cylinder and first and second covers fixed to opposite end portions of said cylinder; a first feed through assembly mounted to said first cover so as to extend therethrough, for introducing a plurality of first optical fibers of a first tail cable into said pressure-resistant housing; a second feed through assembly mounted to said second cover so as to extend therethrough, for introducing a plurality of second optical fibers of a second tail cable into said pressure-resistant housing; a mounting plate mounted on said first cover; first and second fiber distributing blocks fixed to said mounting plate and each having a plurality of guide grooves for respectively guiding said first optical fibers; a plurality of optical equalizing modules mounted on said mounting plate and respectively connected to said first optical fibers; and a fiber accommodating structure mounted on said second cover and accommodating a plurality of first splice portions for respectively splicing said first optical fibers to said second optical fibers.

The gain equalizing device further comprises a plurality of second splice portions for respectively splicing a plurality of optical fibers of a first main cable to selected one of the optical fibers of the first tail cable, and a plurality of third splice portions for respectively splicing a plurality of optical fibers of a second main cable to selected one of the optical fibers of the second tail cable.

For example, when n (n is an integer greater than or equal to 2) optical fibers are included in each of the first and second main cables, 3n optical fibers are included in each of the first and second tail cables. While the fiber accommodating structure is mounted on the second cover in the above configuration, it may be mounted on the mounting plate.

In accordance with another aspect of the present invention, there is provided a gain equalizing device comprising a pressure-resistant housing comprising a cylinder and first and second covers fixed to opposite end portions of said cylinder; a first feed through assembly mounted to said first cover so as to extend therethrough, for introducing a plurality of first optical fibers of a first tail cable into said pressure-resistant housing; a second feed through assembly mounted to said second cover so as to extend therethrough, for introducing a plurality of second optical fibers of a second tail cable into said pressure-resistant housing; a mounting base mounted on the inner circumferential surface of said cylinder and having a flat mounting surface and an arcuate outer circumferential surface having a radius of curvature substantially equal to the radius of curvature of the inner circumferential surface of said cylinder; first and second fiber distributing blocks fixed to said flat mounting surface of said mounting base and each having a plurality of guide grooves for respectively guiding said first optical fibers; a plurality of optical equalizing modules mounted on said flat mounting surface of said mounting base and respectively connected to said first optical fibers; a C-shaped fixing ring engaged with the inner circumferential surface of said cylinder and said mounting base to fix said mounting base to said cylinder; and a fiber accommodating structure mounted on said second cover and accommodating a plurality of first splice portions for respectively splicing said first optical fibers to said second optical fibers.

In accordance with a further aspect of the present invention, there is provided a gain equalizing device comprising a pressure-resistant housing comprising a cylinder and first and second covers fixed to opposite end portions of said cylinder; a first feed through assembly mounted to said first cover so as to extend therethrough, for introducing a plurality of first optical fibers of a first tail cable into said pressure-resistant housing; a second feed through assembly mounted to said second cover so as to extend therethrough, for introducing a plurality of second optical fibers of a second tail cable into said pressure-resistant housing; a plurality of guide pin pairs provided on said second cover each for holding said second optical fibers to guide them; a plurality of optical equalizing modules mounted on said second cover and respectively connected to said second optical fibers; and a fiber accommodating structure mounted on said second cover and accommodating a plurality of first splice portions for respectively splicing said first optical fibers to said second optical fibers.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
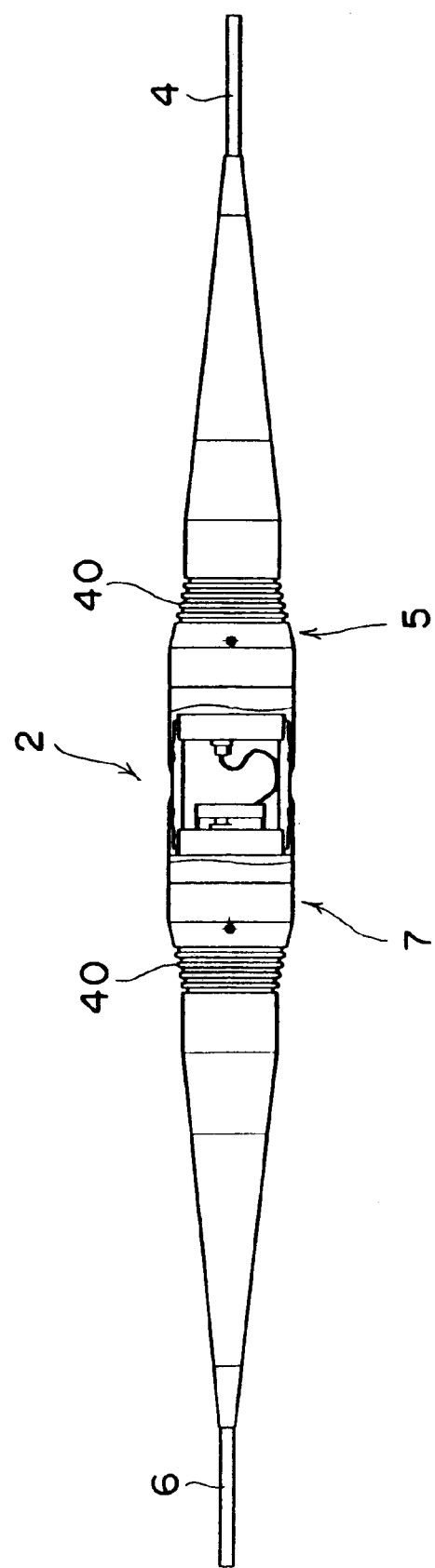
FIG. 1 is a partially cutaway, elevational view of a gain equalizing device and its associated parts according to a first preferred embodiment of the present invention.
Figure 2:
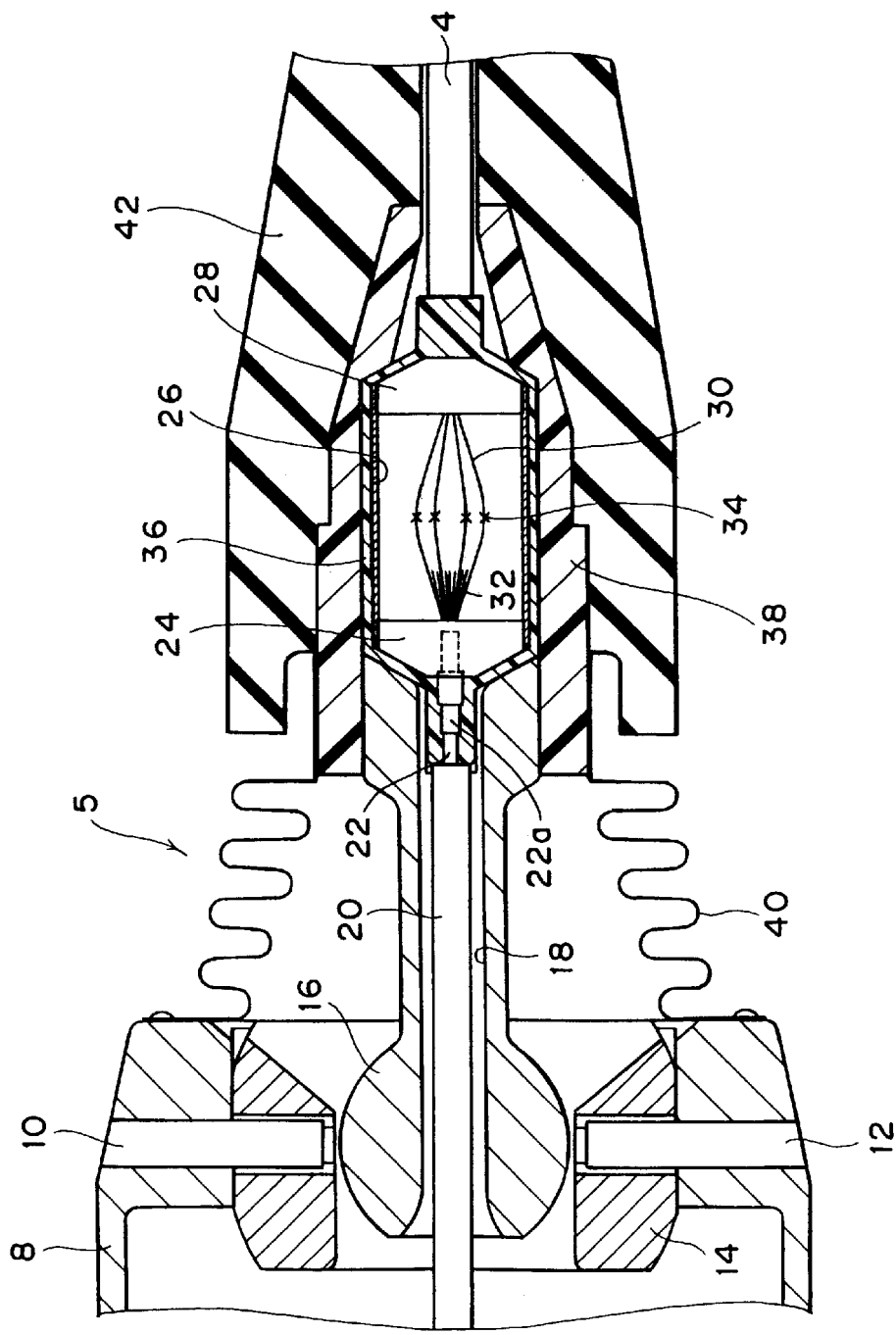
FIG. 2 is a sectional view of a coupling portion and a fiber splice portion in the first preferred embodiment.

Referring to FIG. 1, there is shown a partially cutaway, elevational view of a gain equalizing device 2 and its associated parts according to a first preferred embodiment of the present invention. The gain equalizing device 2 is connected at one end thereof through a coupling 5 to a first main cable 4 and connected at the other end through a coupling 7 to a second main cable 6. FIG. 2 is a sectional view of the coupling 5 and a fiber splice portion. The coupling 7 is similar in structure to the coupling 5, so the structure of the coupling 5 will be representatively described.

Referring to FIG. 2, reference numeral 8 denotes a gimbal housing, which is connected to a pressure-resistant housing 44 (see FIG. 3) of the gain equalizing device 2. A gimbal ring 14 is mounted to the gimbal housing 8 by a pair of pins 10 and 12 extending in one direction. A gimbal 16 is rotatably mounted to the gimbal ring 14 by a pair of pins (not shown) extending in a direction perpendicular to the direction of extension of the pins 10 and 12. With this structure, the first and second main cables 4 and 6 are allowed to be displaced in any directions relative to the gain equalizing device 2.

The gimbal 16 has a bore 18, and a first tail cable 20 connected to the gin equalizing device 2 is inserted in the bore 18. The first tail cable 20 has a copper pipe 22, and a plurality of (twelve in this preferred embodiment) optical fibers 32 are accommodated in the copper pipe 22. The copper pipe 22 is connected through a tip 22a to a metal plate 24, and the metal plate 24 is connected to a metal cylinder 26 at one end thereof. On the other hand, a copper pipe (not shown) of the first main cable 4 is connected to a metal plate 28, and the metal plate 28 is connected to the other end of the metal cylinder 26. Accordingly, the copper pipe 22 of the first tail cable 20 is connected through the tip 22a, the metal plate 24, the metal cylinder 26, and the metal plate 28 to the copper pipe of the first main cable 4.

The first main cable 4 accommodates two systems and therefore has four optical fibers 30. The four optical fibers 30 of the first main cable 4 are respectively connected through four splice portions 34 to four selected ones of the twelve optical fibers 32 of the first tail cable 20. The selection of four optical fibers from the twelve optical fibers 32 of the first tail cable 20 will be hereinafter described in detail.

The metal cylinder 26 is covered with a molded resin 36, and the molded resin 36 is covered with a resin holder 38. The gimbal housing 8 and the resin holder 38 are mechanically connected by the gimbal 16. Reference numeral 40 denotes a bellows. Further, the resin holder 38 and the first main cable 4 are covered with a rubber boot 42.

Figure 3:
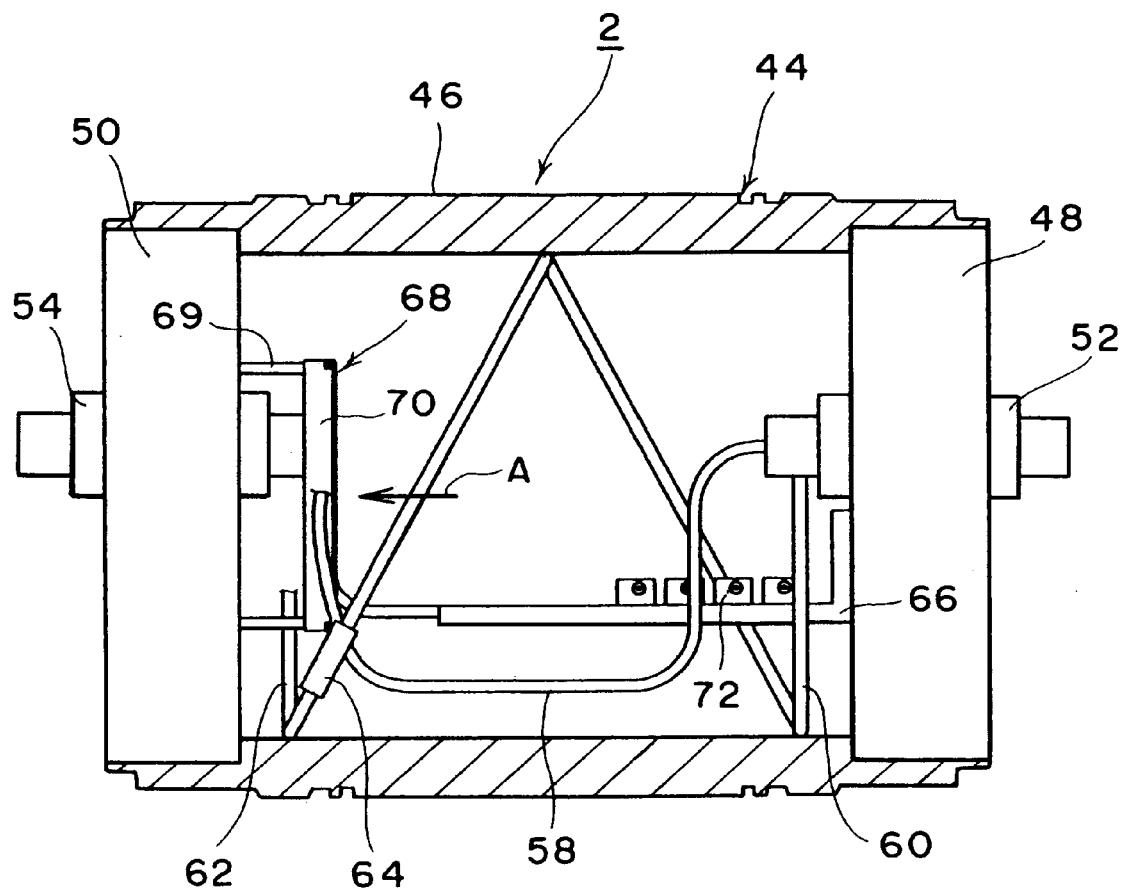
FIG. 3 is a sectional view of the gain equalizing device according to the first preferred embodiment.

Referring to FIG. 3, there is shown a sectional view of the gain equalizing device 2 according to the first preferred embodiment. Reference numeral 44 denotes a pressure-resistant housing composed of a cylinder 46 and a pair of covers 48 and 50 welded to the opposite ends of the cylinder 46. The cylinder 46 and the covers 48 and 50 are formed of beryllium copper, for example. A feed through 52 is mounted to the cover 48 so as to extend therethrough. Similarly, a feed through 54 is mounted to the cover 50 so as to extend therethrough. The feed through 52 and 54 function to liquid-tightly connect the inside and the outside of the pressure-resistant housing 44.

The optical fibers 32 of the first tail cable 20 and a feeder line 60 connected to the copper pipe 22 are introduced into the pressure-resistant housing 44 through the feed through 52. Similarly, optical fibers of a second tail cable (not shown) and a feeder line 62 are introduced into the pressure-resistant housing 44 through the feed through 54. Reference numeral 64 denotes a connecting portion between the feeder line 60 and the feeder line 62. The optical fibers 32 from the first tail cable 20 are partially accommodated in a tube 58 for protection in the pressure-resistant housing 44.

A substantially L-shaped mounting plate 66 is fixed to the inner surface of the cover 48. A plurality of optical equalizing modules 72 are mounted on the mounting plate 66. Although four optical equalizing modules 72 are shown in FIG. 3, twelve optical equalizing modules 72 are actually mounted on the mounting plate 66. On the other hand, a fiber accommodating structure 68 having an accommodating ring 70 is mounted through a support member 69 to the inner surface of the cover 50. The fiber accommodating structure 68 is configured as shown in FIG. 4.

Figure 4:
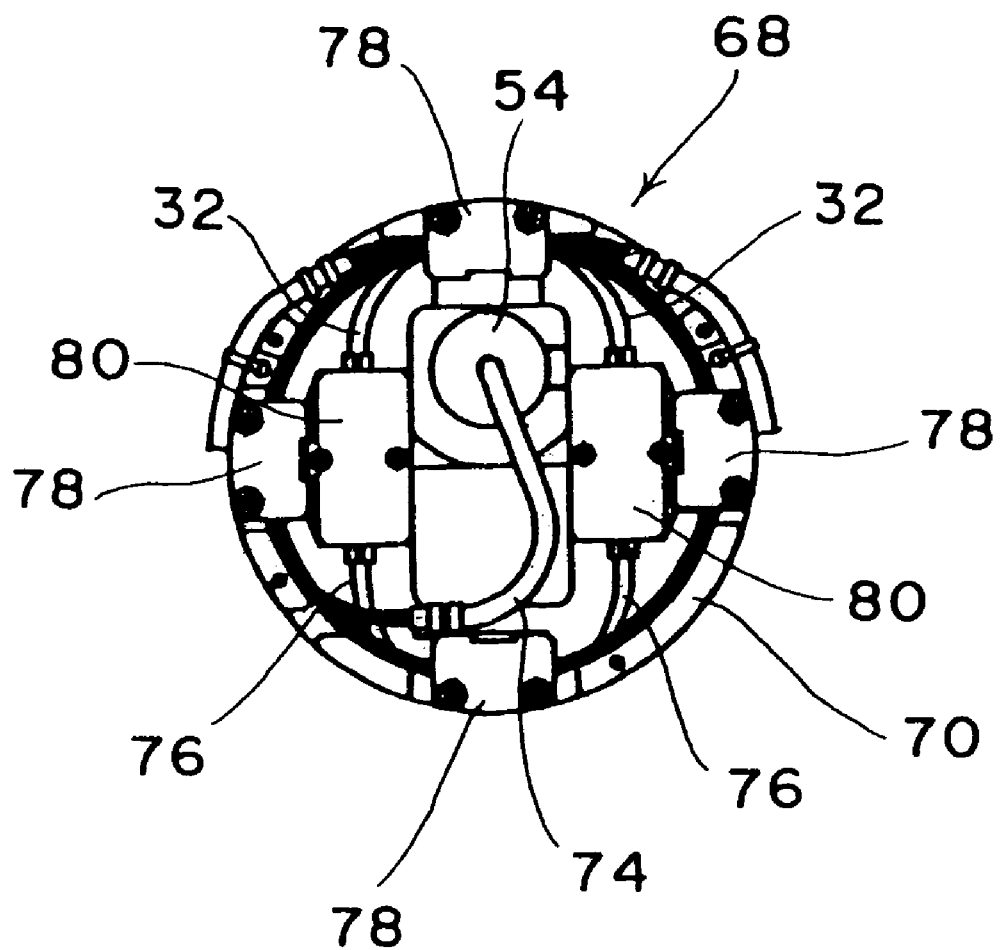
FIG. 4 is a view taken in the direction shown by an arrow A in FIG. 3.

Referring to FIG. 4, optical fibers 76 from the second tail cable introduced into the pressure-resistant housing 44 through the feed through 54 are partially accommodated in a tube 74 for protection, and are annularly guided by four guide portions 78. Reference numerals 80 denote splice portions for splicing the optical fibers 32 from the first tail cable 20 to the optical fibers 76 from the second tail cable (not shown). Although four optical fibers 32 are spliced to four optical fibers 76 in FIG. 4, twelve optical fibers 32 are actually spliced to twelve optical fibers 76 in the fiber accommodating structure 68.

Figure 5:
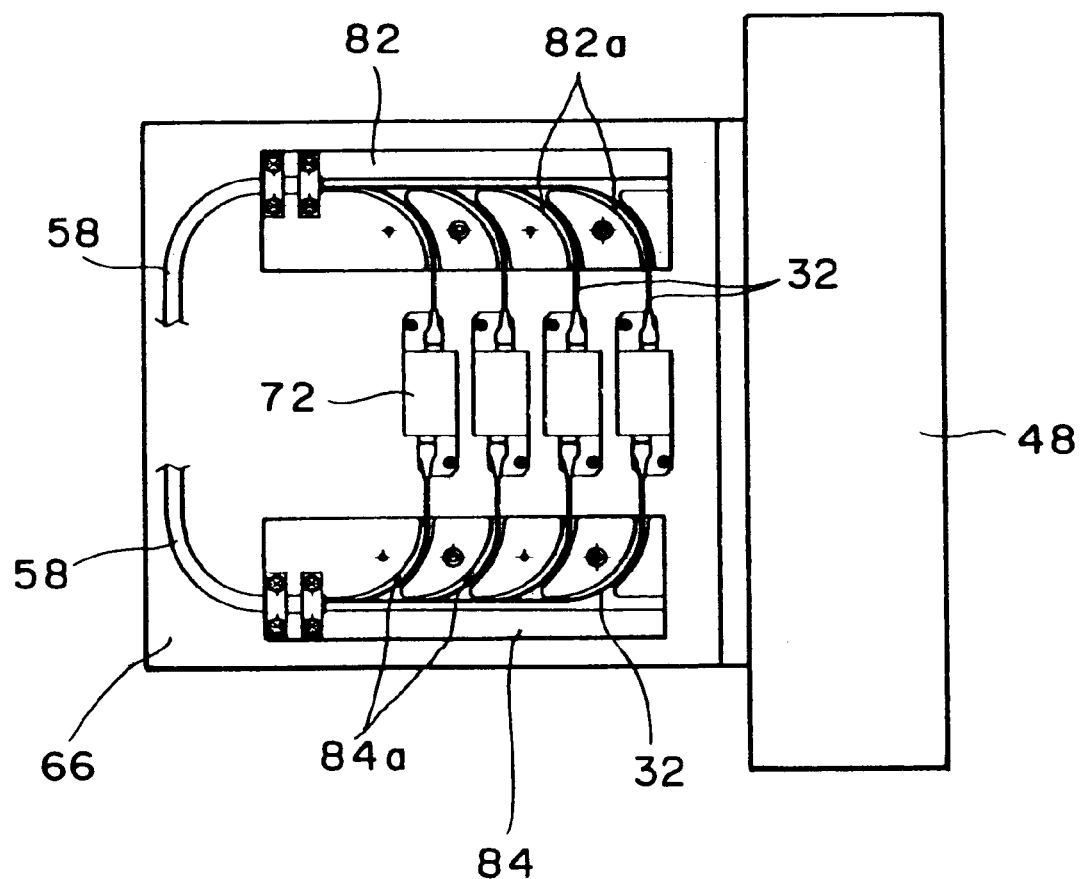
FIG. 5 is a plan view of an optical equalizing module mounting structure in the first preferred embodiment.

Referring to FIG. 5, there is shown a plan view of an optical equalizing module mounting structure in the first preferred embodiment. Two fiber distributing blocks 82 and 84 are fixed to the mounting plate 66 by screws. The fiber distributing blocks 82 and 84 have a plurality of guide grooves 82a and 84a for guiding the optical fibers 32, respectively. Each of the guide grooves 82a and 84a is curved so as to ensure the minimum allowable bend radius of each optical fiber 32.

A plurality of optical equalizing modules 72 to which the optical fibers 32 are connected are mounted on the mounting plate 66. Although four optical equalizing modules 72 are shown, twelve optical equalizing modules 72 are actually mounted on the mounting plate 66. That is, each of the main cables 4 and 6 includes four optical fibers, and three optical equalizing modules 72 having different equalization characteristics are provided per optical fiber. These three equalizing modules 72 per optical fiber include three equalizing filters having different characteristics as shown in FIGS. 6A, 6B, and 6C, respectively.

Figure 6A:
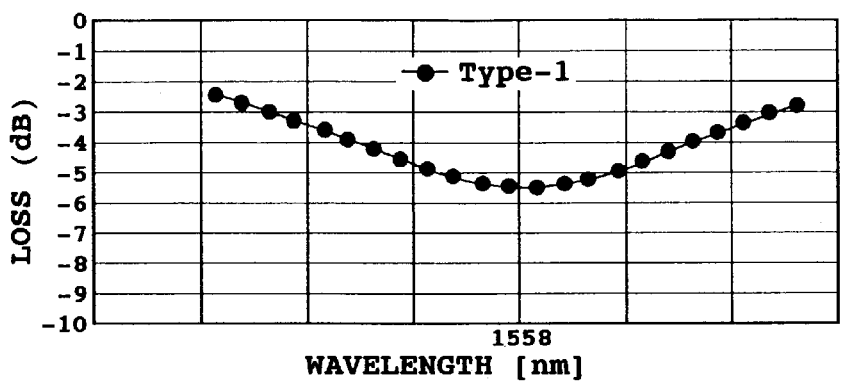
FIG. 6A is a graph showing an equalizing filter characteristic giving a minimum loss.
Figure 6B:
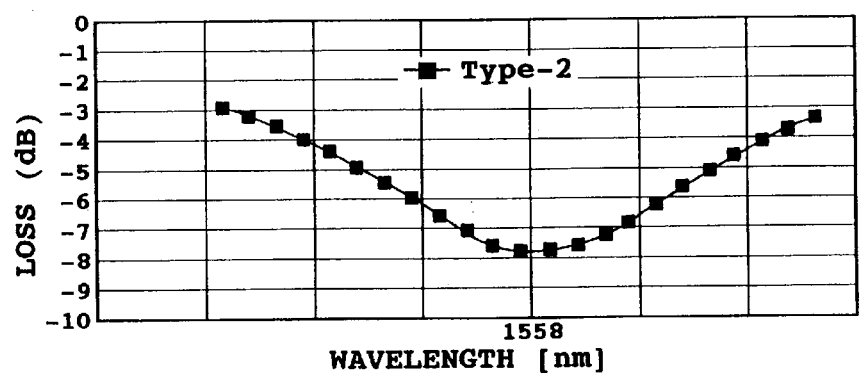
FIG. 6B is a graph showing an equalizing filter characteristic giving a normal loss.

Usually, the equalizing filter of Type 2 shown in FIG. 6B is used. In the case that the gain at a central region of a gain band is large, the equalizing filter of Type 3 giving a maximum loss as shown in FIG. 6C is used. In the case that the gain at both end regions of a gain band is larger than the gain at the central region, the equalizing filter of Type 1 giving a minimum loss as shown in FIG. 6A is used. Referring again to FIG. 2, the optical fiber 32 connected to the optical equalizing module 72 including the equalizing filter having the characteristic shown in FIG. 6B is connected to one of the optical fibers 30 of the main cable 4, and the characteristic of the optical fiber 30 is measured.

Figure 6C:
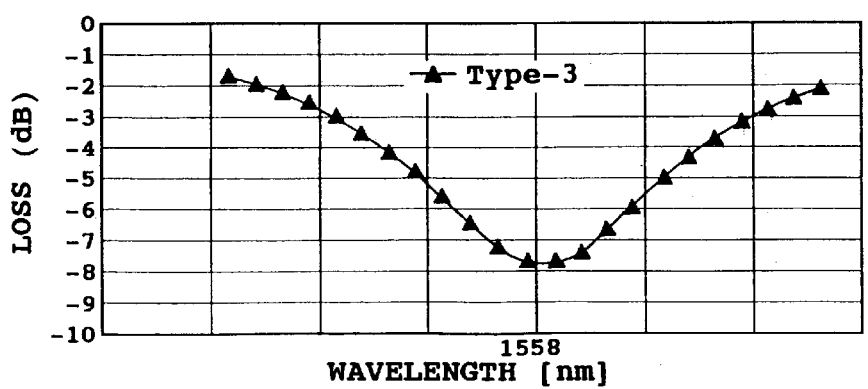
FIG. 6C is a graph showing an equalizing filter characteristic giving a maximum loss.

Then, according to the shape of a gain curve in a gain band as measured, the optical fiber 32 connected to any optimum one of the optical equalizing modules 72 having the different characteristics shown in FIGS. 6A to 6C is selected, and the selected optical fiber 32 is next spliced to the optical fiber 30 of the main cable 4. As to the other three optical fibers 30 of the main cable 4, the optical fibers 32 connected to the optical equalizing modules 72 giving optimum characteristics are selected and spliced to the optical fibers 30, respectively.

Figure 7:
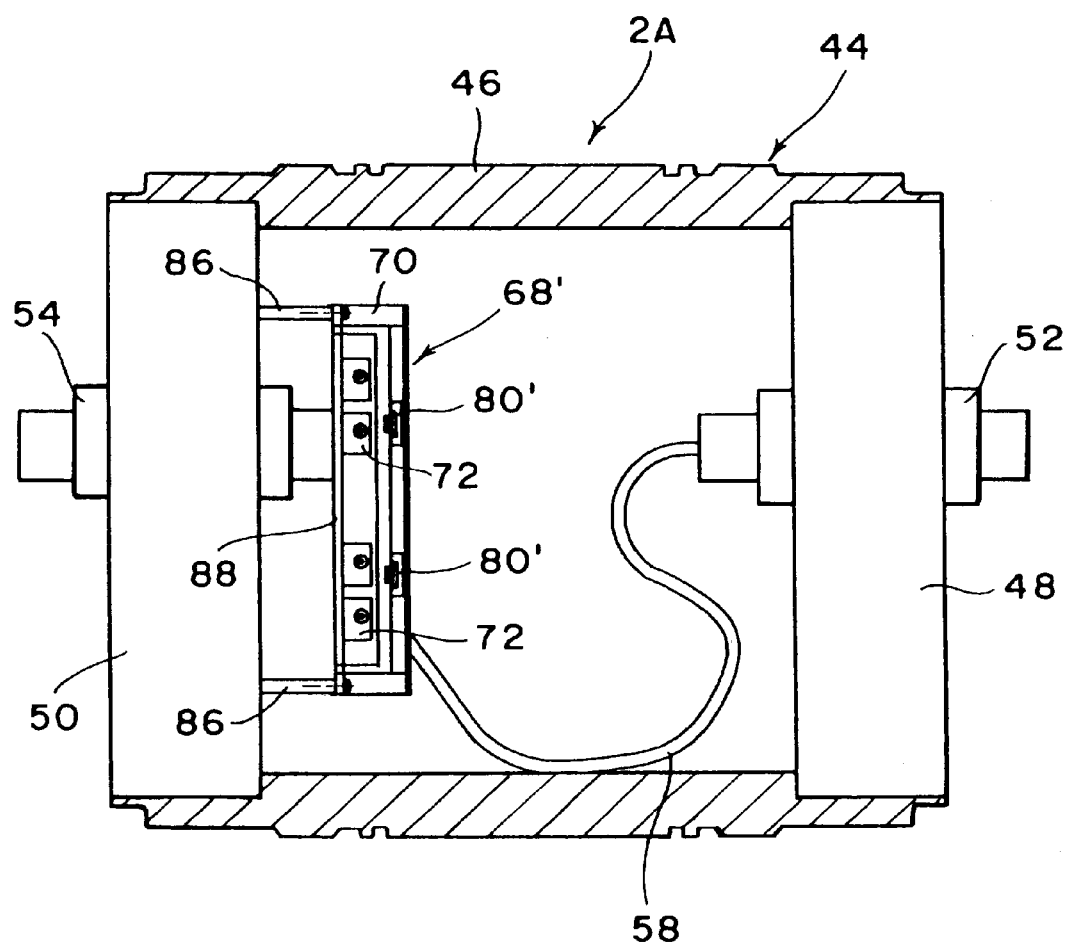
FIG. 7 is a sectional view of a gain equalizing device according to a second preferred embodiment of the present invention.
Figure 8:
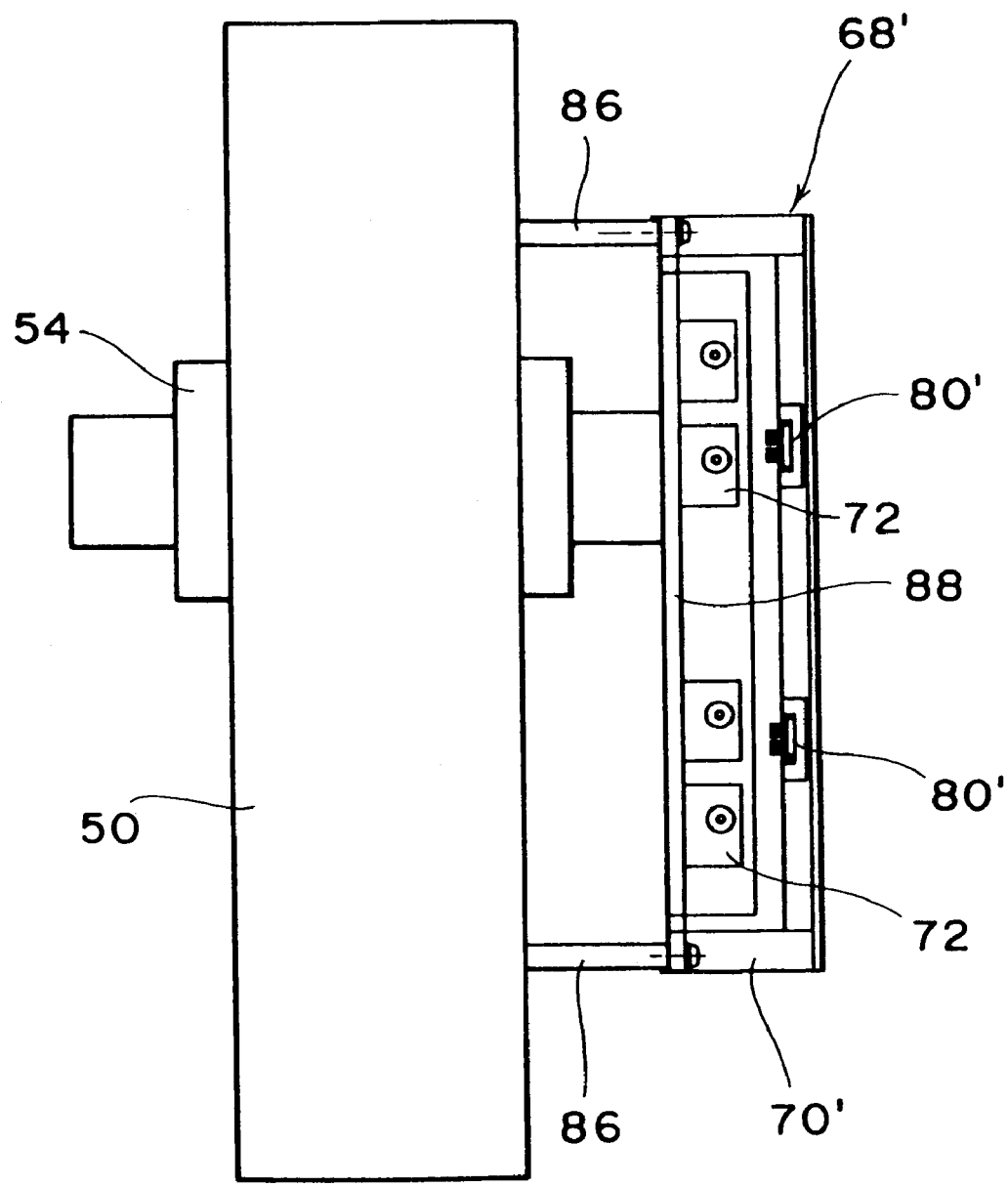
FIG. 8 is an enlarged view of an optical equalizing module mounting structure in the second preferred embodiment.

Referring to FIG. 7, there is shown a sectional view of a gain equalizing device 2A according to a second preferred embodiment of the present invention. In this preferred embodiment, a plurality of optical equalizing modules 72 and a fiber accommodating structure 68' are mounted in tandem on the inner surface of a cover 50. More specifically, as best shown in FIG. 8 which is an enlarged view of an essential part of FIG. 7, a mounting plate 88 is mounted through a support member 86 onto the inner surface of the cover 50, and the plural (actually twelve) optical equalizing modules 72 are mounted on the mounting plate 88.

Although not especially shown, fiber distributing blocks 82 and 84 as shown in FIG. 5 are mounted on the mounting plate 88. The fiber accommodating structure 68' having an accommodating ring 70' is also mounted on the mounting plate 88. Reference numerals 80' denote fiber splice portions.

Figure 9:
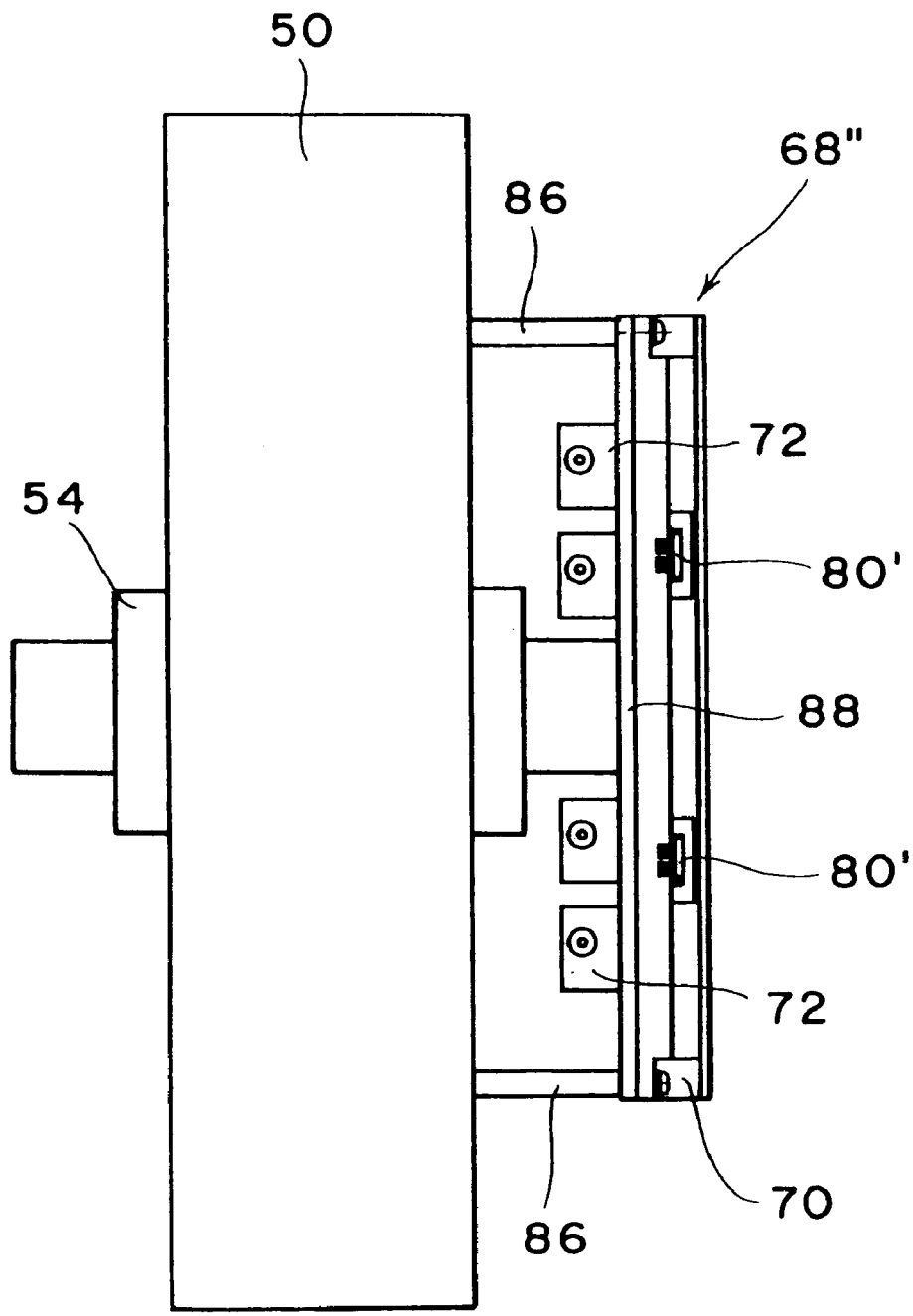
FIG. 9 is a view similar to FIG. 8, showing a modification of the second preferred embodiment.

Referring to FIG. 9, there is shown a modification of the second preferred embodiment. In this modification, a plurality of optical equalizing modules 72 are mounted on the back surface of a mounting plate 88, and a fiber accommodating structure 68" having an accommodating ring 70 is mounted on the front surface of the mounting plate 88.

Figure 10:
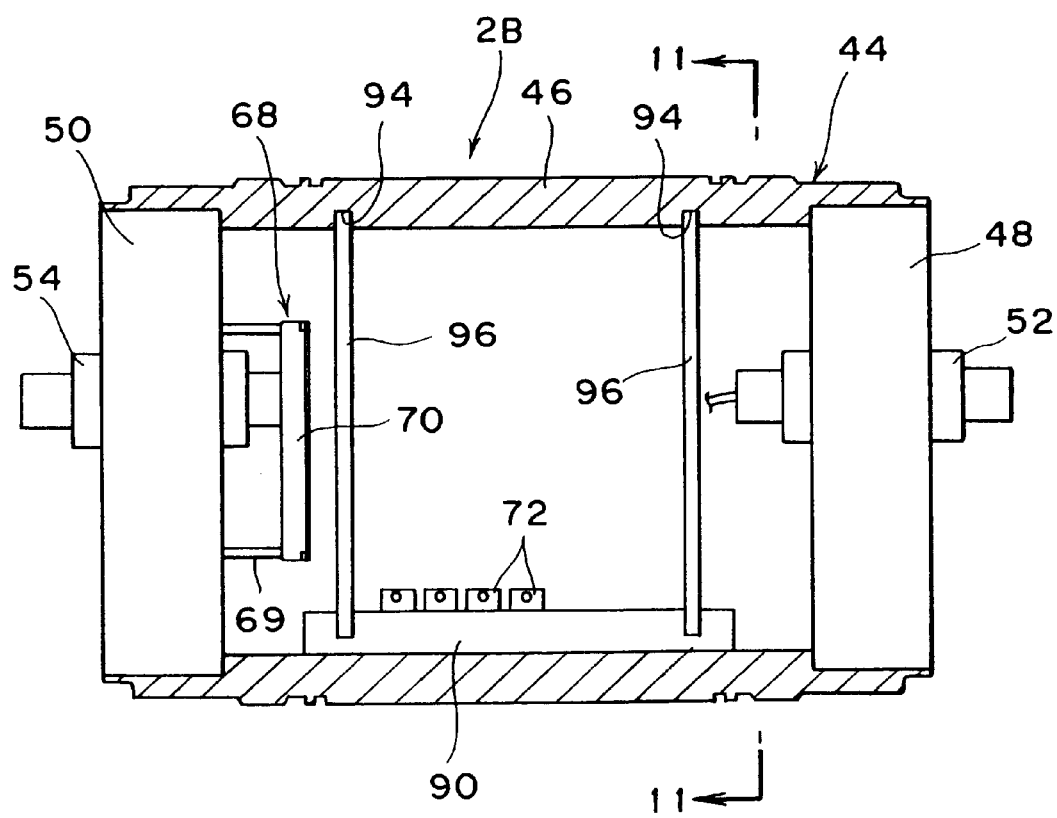
FIG. 10 is a sectional view of a gain equalizing device according to a third preferred embodiment of the present invention.
Figure 12:
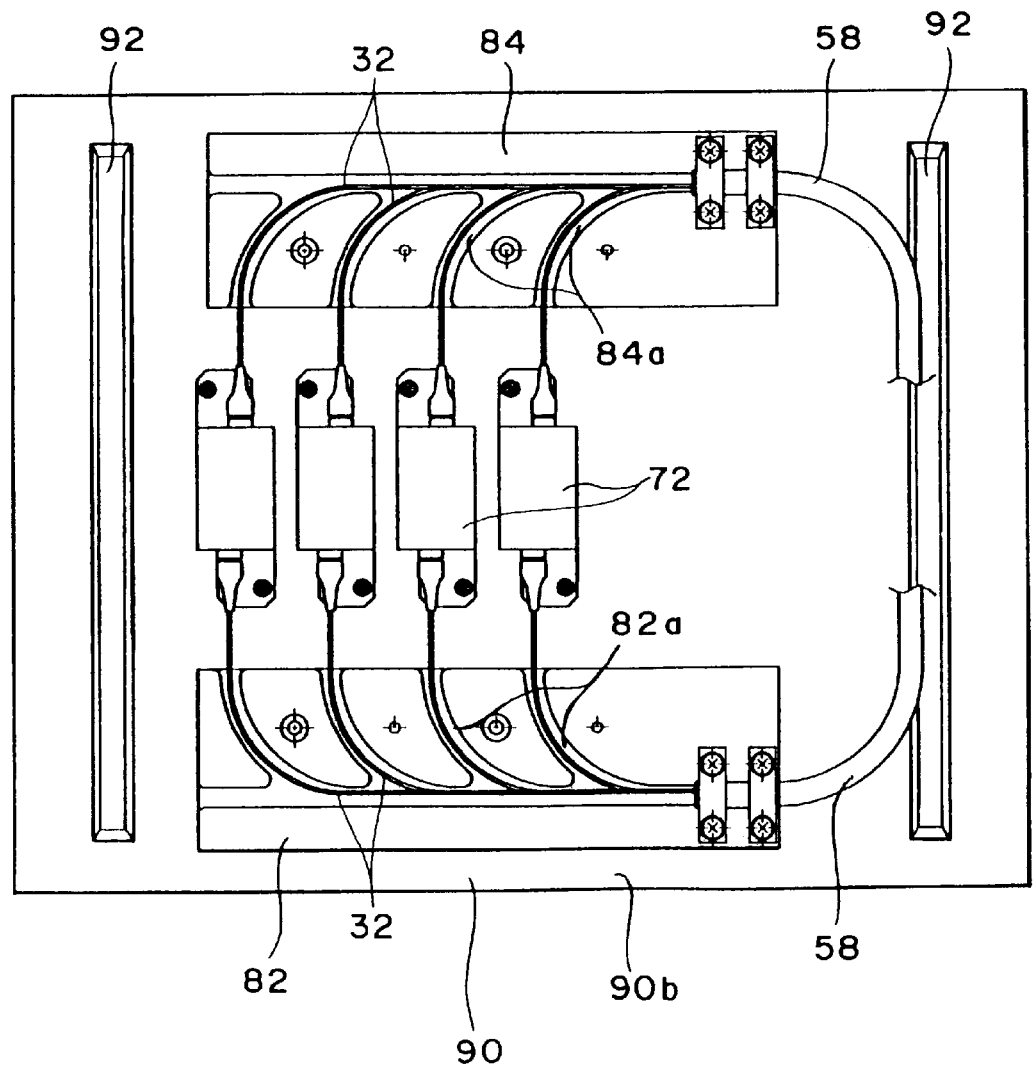
FIG. 12 is a plan view of an optical equalizing module mounting structure in the third preferred embodiment.
Figure 13:
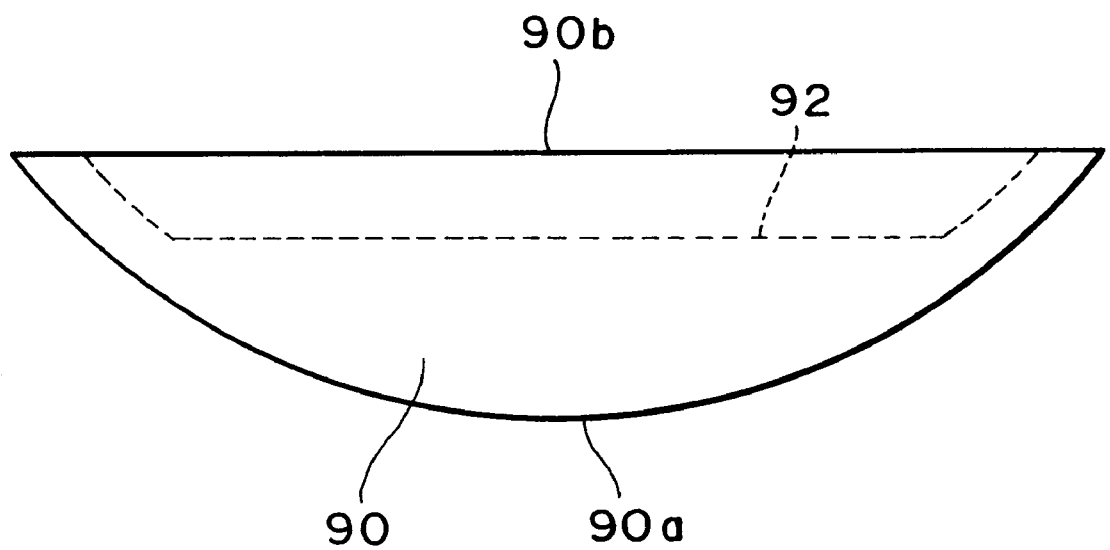
FIG. 13 is a side view of a mounting base in the third preferred embodiment.

Referring to FIG. 10, there is shown a sectional view of a gain equalizing device 2B according to a third preferred embodiment of the present invention. In this preferred embodiment, a mounting base 90 having a specific shape as shown in FIG. 13 is used. As shown in FIG. 13, the mounting base 90 has an arcuate outer circumferential surface 90a having a radius of curvature substantially equal to the radius of curvature of the inner circumferential surface of a cylinder 46 and a flat mounting surface 90b. As shown in FIG. 12, which is a plan view of an optical equalizing module mounting structure in the third preferred embodiment, the flat mounting surface 90b of the mounting base 90 is formed with a pair of grooves 92. Further, two fiber distributing blocks 82 and 84 are fixed to the mounting surface 90b of the mounting base 90, and twelve optical equalizing modules 72 (only four being shown) are mounted on the mounting surface 90b.

Figure 11:
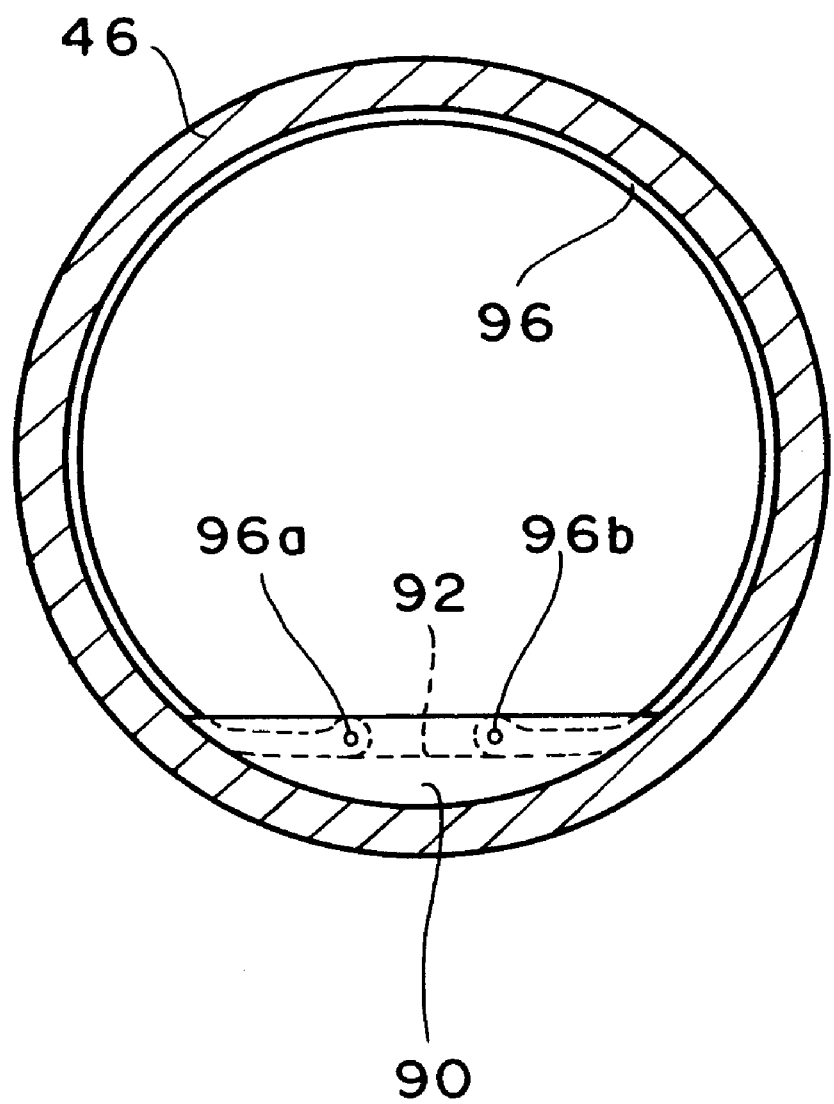
FIG. 11 is a cross section taken along the line 11—11 in FIG. 10.

Referring again to FIG. 10, the inner circumferential surface of the cylinder 46 is formed with a pair of C-shaped grooves 94. As also shown in FIG. 11, a pair of C-shaped fixing rings 96 are respectively inserted in the pair of C-shaped grooves 94 in such a manner that opposite end portions 96a and 96b of each fixing ring 96 are engaged with the corresponding groove 92 of the mounting base 90, thereby fixing the mounting base 90 to the cylinder 46. Like the first preferred embodiment, a fiber accommodating structure 68 having an accommodating ring 70 is mounted through a support member 69 onto the inner surface of a cover 50. The other configuration is similar to that of the first preferred embodiment shown in FIG. 3, and it is partially not shown in FIG. 10.

Figure 14:
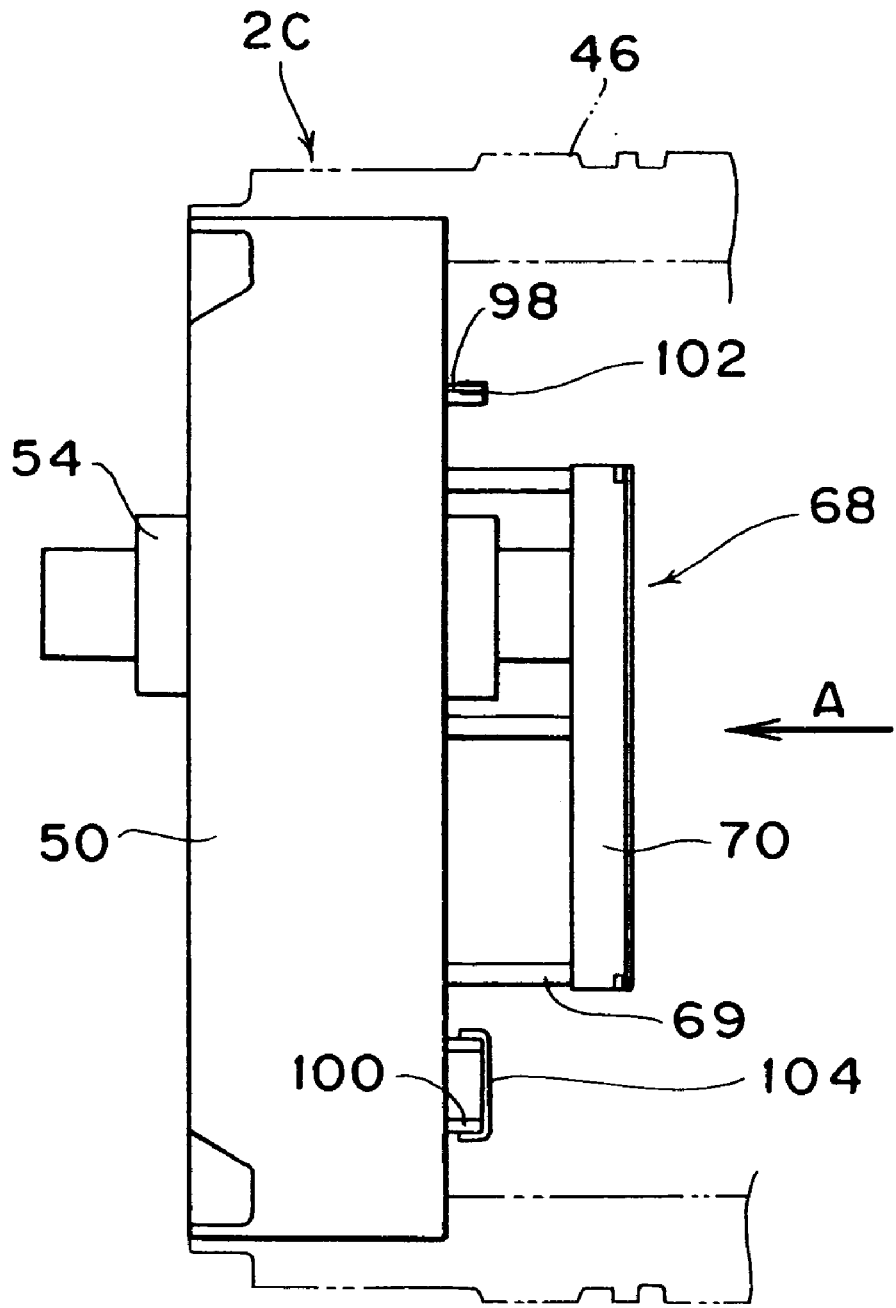
FIG. 14 is a schematic elevation showing a part of a gain equalizing device according to a fourth preferred embodiment of the present invention.
Figure 15:
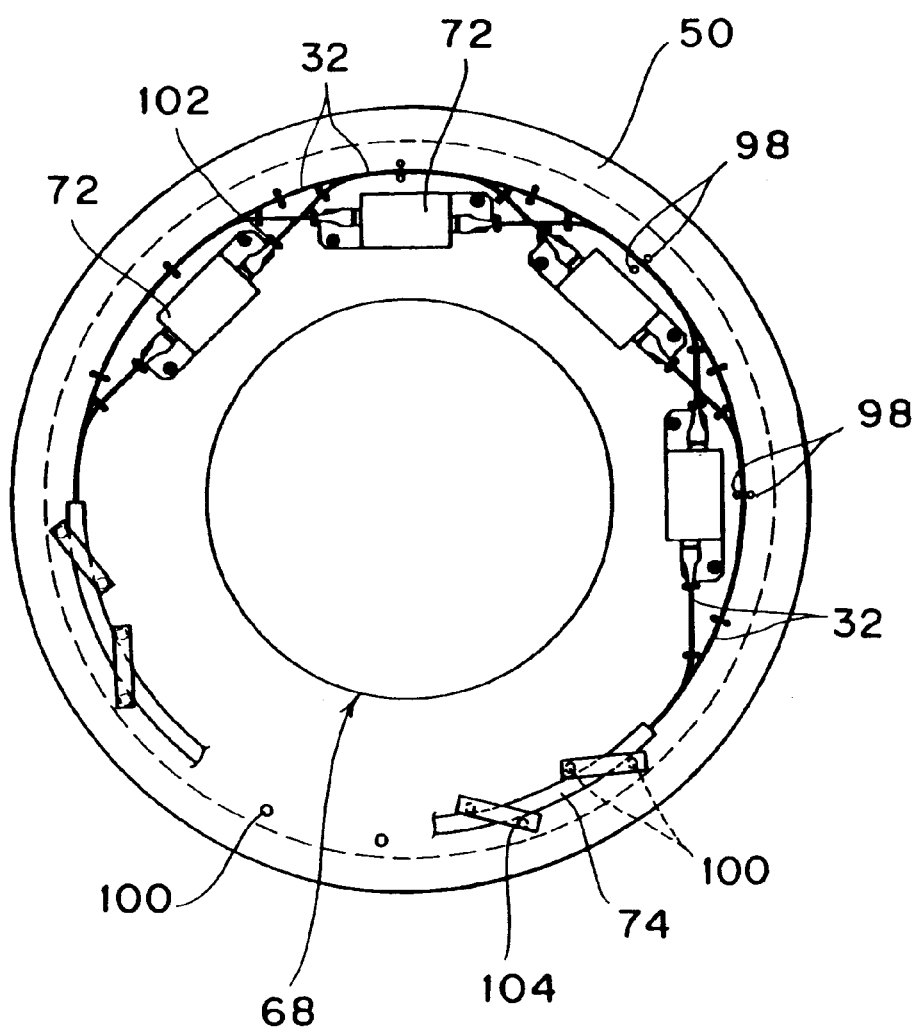
FIG. 15 is a view taken in the direction shown by an arrow A in FIG. 14.

Referring to FIG. 14, there is shown a schematic elevation of a gain equalizing device 2C according to a fourth preferred embodiment of the present invention. FIG. 15 is a view taken in the direction shown by an arrow A in FIG. 14. As shown in FIG. 15, a plurality of guide pin pairs 98 each for holding optical fibers therebetween to guide them and a plurality of guide pin pairs 100 each for holding a tube 74 partially accommodating the optical fibers therebetween to arcuately guide it are formed on the inner surface of a cover 50. Further, twelve optical equalizing modules 72 (only four being shown) are mounted on the inner surface of the cover 50.

Each guide pin pair 98 is covered with a holder 102 to prevent the optical fibers from escaping, and each guide pin pair 100 is also covered with a holder 104 to prevent the tube 74 from escaping. As best shown in FIG. 14, a fiber accommodating structure 68 having an accommodating ring 70 is mounted through a support member 69 onto the inner surface of the cover 50 like the first preferred embodiment. The other configuration of this preferred embodiment is similar to that of the first preferred embodiment shown in FIG. 3.

According to the present invention, one optical fiber transmission line is connectable to a plurality of optical equalizing modules having different equalization characteristics. Accordingly, it is possible to provide a gain equalizing device which can exhibit an optimum equalization characteristic according to the amplification characteristic of a repeater and the transmission characteristic of a cable. Further, a compact gain equalizing device can be realized by adopting the mounting structure of the present invention.

What is claimed is:

1. A gain equalizing device comprising:
a pressure-resistant housing comprising a cylinder and first and second covers fixed to opposite end portions of said cylinder;
a first feed through assembly mounted to said first cover so as to extend therethrough, for introducing a plurality of first optical fibers of a first tail cable into said pressure-resistant housing;
a second feed through assembly mounted to said second cover so as to extend therethrough, for introducing a plurality of second optical fibers of a second tail cable into said pressure-resistant housing;
a mounting plate mounted on said first cover;
first and second fiber distributing blocks fixed to said mounting plate and each having a plurality of guide grooves for respectively guiding said first optical fibers;
a plurality of optical equalizing modules mounted on said mounting plate and respectively connected to said first optical fibers; and
a fiber accommodating structure mounted on said second cover and accommodating a plurality of first splice portions for respectively splicing said first optical fibers to said second optical fibers.

2. A gain equalizing device according to claim 1, wherein said first optical fibers are partially inserted in a first protective tube in said pressure-resistant housing, and said second optical fibers are partially inserted in a second protective tube in said pressure-resistant housing.

3. A gain equalizing device according to claim 1, further comprising:
a first main cable having a plurality of third optical fibers;
a second main cable having a plurality of fourth optical fibers;
a plurality of second splice portions for respectively splicing said third optical fibers of said first main cable to selected ones of said first optical fibers of said first tail cable; and
a plurality of third splice portions for respectively splicing said fourth optical fibers of said second main cable to selected ones of said second optical fibers of said second tail cable.

4. A gain equalizing device comprising:
a pressure-resistant housing comprising a cylinder and first and second covers fixed to opposite end portions of said cylinder;
a first feed through assembly mounted to said first cover so as to extend therethrough, for introducing a plurality of first optical fibers of a first tail cable into said pressure-resistant housing;
a second feed through assembly mounted to said second cover so as to extend therethrough, for introducing a plurality of second optical fibers of a second tail cable into said pressure-resistant housing;
a mounting plate mounted on said second cover;
first and second fiber distributing blocks fixed to said mounting plate and each having a plurality of guide grooves for respectively guiding said second optical fibers;
a plurality of optical equalizing modules mounted on said mounting plate and respectively connected to said second optical fibers; and
a fiber accommodating structure mounted on said mounting plate and accommodating a plurality of first splice portions for respectively splicing said first optical fibers to said second optical fibers.

5. A gain equalizing device according to claim 4, wherein said first optical fibers are partially inserted in a first protective tube in said pressure-resistant housing, and said second optical fibers are partially inserted in a second protective tube in said pressure-resistant housing.

6. A gain equalizing device according to claim 4, further comprising:
- a first main cable having a plurality of third optical fibers;
- a second main cable having a plurality of fourth optical fibers;
- a plurality of second splice portions for respectively splicing said third optical fibers of said first main cable to selected ones of said first optical fibers of said first tail cable; and
- a plurality of third splice portions for respectively splicing said fourth optical fibers of said second main cable to selected ones of said second optical fibers of said second tail cable.

7. A gain equalizing device comprising:
- a pressure-resistant housing comprising a cylinder and first and second covers fixed to opposite end portions of said cylinder;
- a first feed through assembly mounted to said first cover so as to extend therethrough, for introducing a plurality of first optical fibers of a first tail cable into said pressure-resistant housing;
- a second feed through assembly mounted to said second cover so as to extend therethrough, for introducing a plurality of second optical fibers of a second tail cable into said pressure-resistant housing;
- a mounting base mounted on an inner circumferential surface of said cylinder and having a flat mounting surface and an arcuate outer circumferential surface having a radius of curvature substantially equal to the radius of curvature of the inner circumferential surface of said cylinder;
- first and second fiber distributing blocks fixed to said flat mounting surface of said mounting base and each having a plurality of guide grooves for respectively guiding said first optical fibers;
- a plurality of optical equalizing modules mounted on said flat mounting surface of said mounting base and respectively connected to said first optical fibers;
- a C-shaped fixing ring engaged with the inner circumferential surface of said cylinder and said mounting base to fix said mounting base to said cylinder; and
- a fiber accommodating structure mounted on said second cover and accommodating a plurality of first splice portions for respectively splicing said first optical fibers to said second optical fibers.

8. A gain equalizing device according to claim 7, wherein the inner circumferential surface of said cylinder has a C-shaped groove, and said flat mounting surface of said mounting base has a groove, said C-shaped fixing ring being inserted in said C-shaped groove of said cylinder so that opposite end portions of said C-shaped fixing ring are engaged with said groove of said mounting base.

9. A gain equalizing device according to claim 7, wherein said first optical fibers are partially inserted in a first protective tube in said pressure-resistant housing, and said second optical fibers are partially inserted in a second protective tube in said pressure-resistant housing.

10. A gain equalizing device according to claim 7, further comprising:
- a first main cable having a plurality of third optical fibers;
- a second main cable having a plurality of fourth optical fibers;
- a plurality of second splice portions for respectively splicing said third optical fibers of said first main cable to selected ones of said first optical fibers of said first tail cable; and
- a plurality of third splice portions for respectively splicing said fourth optical fibers of said second main cable to selected ones of said second optical fibers of said second tail cable.

11. A gain equalizing device comprising:
- a pressure-resistant housing comprising a cylinder and first and second covers fixed to opposite end portions of said cylinder;
- a first feed through assembly mounted to said first cover so as to extend therethrough, for introducing a plurality of first optical fibers of a first tail cable into said pressure-resistant housing;
- a second feed through assembly mounted to said second cover so as to extend therethrough, for introducing a plurality of second optical fibers of a second tail cable into said pressure-resistant housing;
- a plurality of guide pin pairs provided on said second cover each for holding said second optical fibers to guide them;
- a plurality of optical equalizing modules mounted on said second cover and respectively connected to said second optical fibers; and
- a fiber accommodating structure mounted on said second cover and accommodating a plurality of first splice portions for respectively splicing said first optical fibers to said second optical fibers.

12. A gain equalizing device according to claim 11, further comprising a plurality of holders for respectively covering said guide pin pairs.

13. A gain equalizing device according to claim 11, wherein said first optical fibers are partially inserted in a first protective tube in said pressure-resistant housing, and said second optical fibers are partially inserted in a second protective tube in said pressure-resistant housing.

14. A gain equalizing device according to claim 11, further comprising:
- a first main cable having a plurality of third optical fibers;
- a second main cable having a plurality of fourth optical fibers;
- a plurality of second splice portions for respectively splicing said third optical fibers of said first main cable to selected ones of said first optical fibers of said first tail cable; and
- a plurality of third splice portions for respectively splicing said fourth optical fibers of said second main cable to selected ones of said second optical fibers of said second tail cable.

* * * * *